July 7, 1942.  A. E. PAPP  2,289,207
CURRENT LIMITING CABLE CONNECTOR
Filed April 5, 1940  2 Sheets-Sheet 1
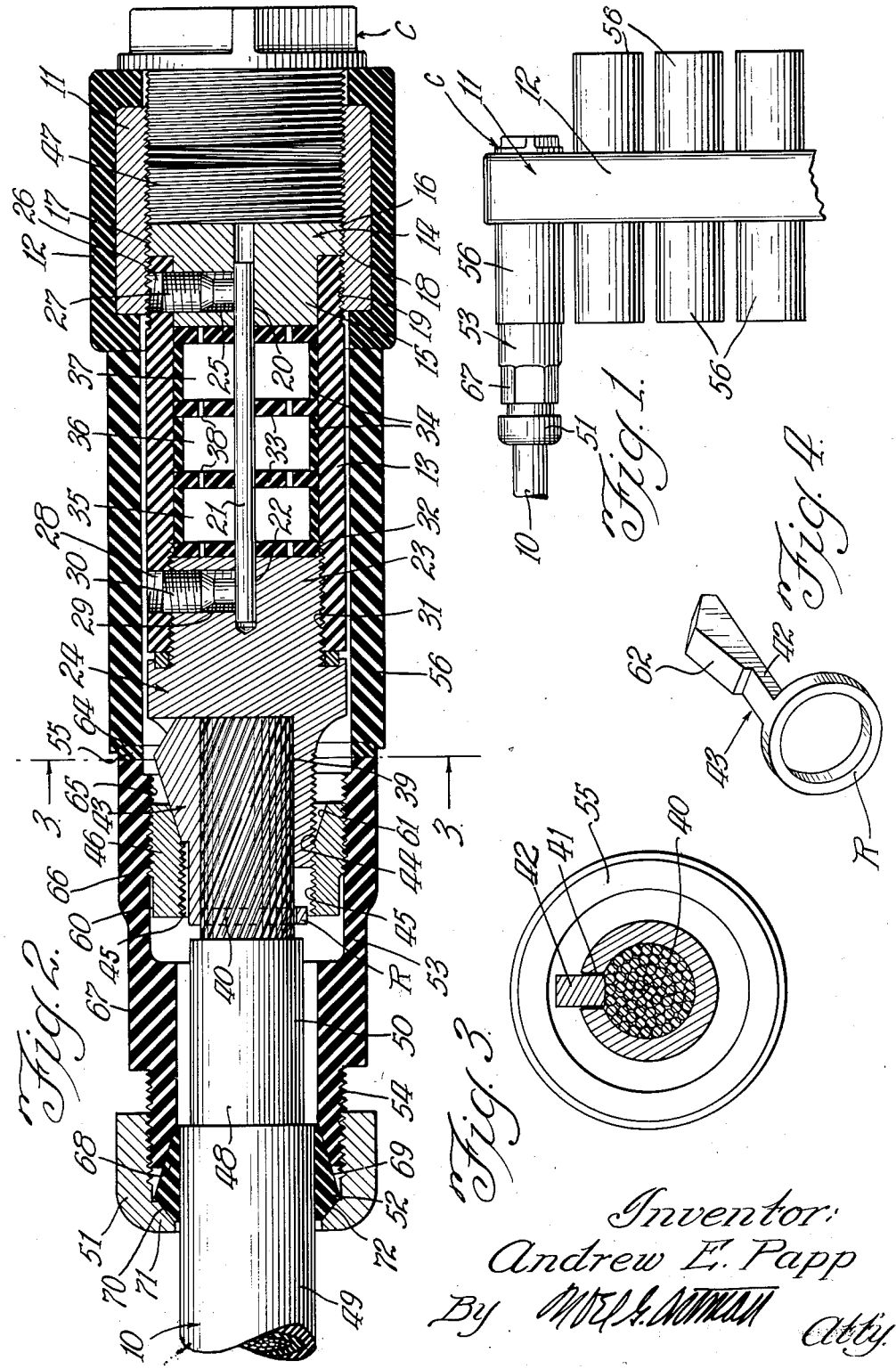
Inventor:
Andrew E. Papp
By [signature] Atty.

July 7, 1942.                A. E. PAPP                2,289,207
                    CURRENT LIMITING CABLE CONNECTOR
                     Filed April 5, 1940         2 Sheets-Sheet 2
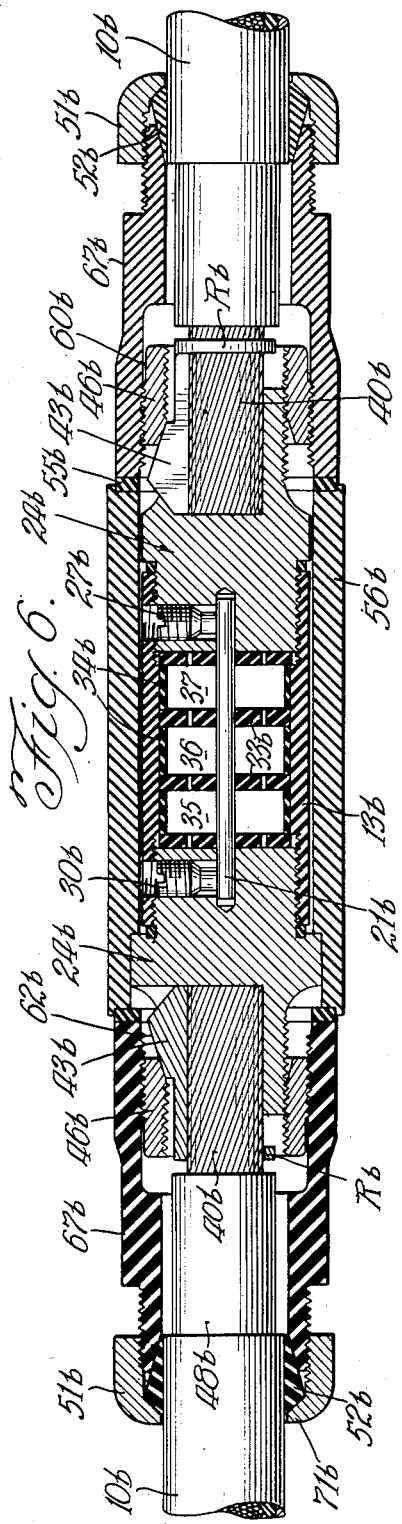
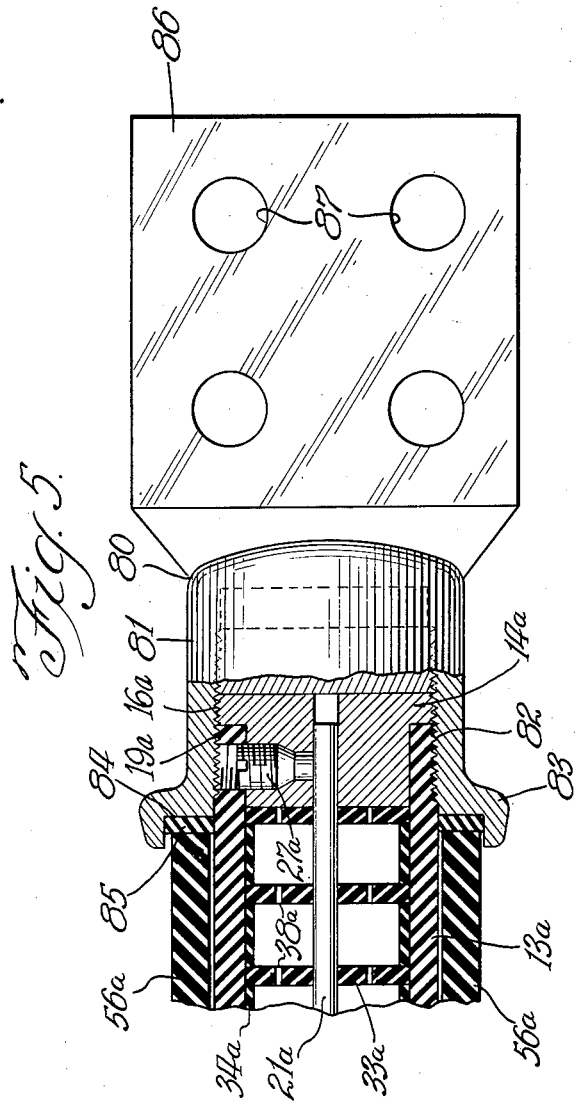
Inventor:
Andrew E. Papp
By: [signature]
Atty.

Patented July 7, 1942

2,289,207

UNITED STATES PATENT OFFICE 2,289,207

CURRENT LIMITING CABLE CONNECTOR

Andrew E. Papp, Crete, Ill., assignor to G & W Electric Specialty Company, Chicago, Ill., a corporation of Illinois Application April 5, 1940, Serial No. 327,971

12 Claims. (Cl. 200—131)

This invention has to do with current limiting devices and relates more particularly to such a device serviceable for mechanically and electrically connecting a cable or the like with another electrical conductor.

High amperage cables, as those employed in secondary distribution networks of electrical utility companies in metropolitan or industrial areas, must be of sufficient diameter that the current required to be carried thereby will not cause them to reach operating temperatures which rapidly deteriorate their insulation coverings. In such areas, however, the load distribution over a system or network is forever changing with the addition of new customers and the changes in the load requirements of present ones. This, together with the possibility of customers simultaneously increasing their demand at a common section of the system, makes it difficult, if not impossible, to predict whether certain cables will be periodically loaded to a point where their temperature unduly impairs the insulation. In some distribution systems this situation has been met by resorting to current limiting means consisting of a fuse link placed in series with those cables wherein overload appears most likely to occur.

Since space is at a premium in cable runs of the present character it is essential that the current limiting connector shall occupy as little space as possible transversely of the cable. In complying with this requirement the contemporary current limiting structures, to which reference has been made, simply consist of a single piece of solid copper wire forming the fuse link connecting the cable with a bus bar or another cable, and wrappings of insulating material covering said wire. Obviously, the fuse link in an arrangement of this kind is subjected to mechanical stresses imposed by the cable. If the wrapping is additionally enclosed by a lead or other metallic sheath, sealed at its ends to lead sheathing of the cable by wiped soldered joints as where water-proofing is necessary, the cost of the installation becomes expensive.

The primary object of this invention is the provision of a new easily installed current limiting cable connector device embodying an insulator coupling member disposable coaxially with a cable for mechanically attaching it to an electrically conductive anchorage such as a bus bar or another cable, and further embodying a fuse link for electrically connecting the cable with said anchorage. Mechanical stress is completely relieved of the fuse link in this device.

Another object of the present invention is the provision of a novel current limiting cable connector device as that just referred to and including a fluid-tight casing requiring but a small amount of transverse space to permit close proximity of adjacent cables.

A further object of the invention is the provision of a current limiting device that is easily detached and reattached pursuant to replacing a fuse link or to rehabilitating the cable system.

A still further object of the invention is the provision of an improved multi-compartment fuse chamber that insures sudden and complete "blowing" of the fuse link.

The above and other desirable objects of the invention will become apparent upon reading the following description with reference to the annexed drawings, wherein:

Fig. 1 is a fragmentary side view of a bus bar having associated therewith a plurality of connector devices constructed in accordance with the present invention;

Fig. 2 is a longitudinal sectional view taken through a preferred embodiment of the invention, and illustrating the connection thereof with a cable and a bus bar;

Fig. 3 is a transverse sectional view taken on the line 3—3 of Fig. 2;

Fig. 4 is a perspective view of a wedge member employed in the structure shown in Fig. 2;

Fig. 5 is a fragmentary sectional view of a modified form of the invention; and

Fig. 6 is a longitudinal sectional view taken through a form of the invention designed for interconnecting axially aligned cable ends.

That form of the invention illustrated in Figs. 1 and 2 is designed for interconnecting an insulated sheath-covered cable, as the cable 10, with a bus bar 11 which is covered with an insulating layer 12, such as hard rubber, "neoprene" or "resistoyl." While the device is shown in association with an insulated and sheath-covered cable and with an insulated bus bar, it will be understood that the device is readily adaptable for connecting any kind of conductor such as a solid conductor, bare or insulated by any kind of a covering, with a bus bar which may be bare or provided with an insulated covering. An examination of Fig. 1 will show the close grouping of cables that is possible with the present form of connector device.

The connector device comprises a fuse chamber of which the side walls are formed by a tubular member 13 of insulating material such as Bakelite, capable of withstanding considerable tensile and compression forces. While the member 13 is cylindrical in the present forms of the invention, and is referred to as a tube or a tubular member, the terms "tube" and "tubular" are intended to connote any closed hollow wall, whether its transverse section be round, oval, or of any polygonal configuration.

An electrical conductor terminal member or cap 14 has a plug section 15 inserted axially into an end of the tube 13 and an exterior threaded section 16. The radius of the threaded section 16 is such that its threads will mesh with the threads 17 about the interior of a recess (or hole) 18 in the bus bar 11. An exterior end section of the tube 13 is threaded at 19, the diameter and pitch of these threads corresponding to that of the threads 17 and forming a continuation of the threads 16. The plug section 15 of the cap 14 has a central axial bore 20 for receiving an end of a fuse link or member 21. The opposite end of the fuse link 21 is inserted into and supported within a bore 22 in a plug section 23 of a terminal member 24. Referring back to the cap or terminal member 14, the bore 20 thereof is intersected by a tapped lateral bore 25, the terminal member being so rotatively associated with the tube 13 that the tapped bore 25 registers with a threaded opening 26 in the right end section of said tube 13. A set screw 27 is turned through the threaded opening 26 and into the tapped bore 25 to force the lower end thereof firmly into engagement with the fuse link 21.

The threads 19 upon the tube 13 constitute attaching means in the form of protuberances directed radially of the tube for resisting axial movement thereof when meshed with the threads 17, and the threads 16 upon the terminal member 14 serve as similar attaching means therefor. By using a sufficiently long set screw 27 to key the tube 13 and the terminal member 14 together, the action of the threads 16 augments that of the threads 19 in resisting axial movement of said tube.

A threaded opening 28 in the opposite end section of the tubular member 13 and a tapped lateral bore 29 communicating with the axial bore 22 in the plug section 23 similarly receive a set screw 30 for bearing firmly against the opposite end of the fuse link. Thus the set screws 27 and 30 insure good electrical contact of the fuse link with the terminal members 14 and 24.

The plug section 23 of the terminal member 24 is exteriorly threaded at 31, and these threads mesh with an internal set of threads 32 within the left-hand end section of the tube 13. After one of the terminal members 14 or 24 has been assembled with its end of the tube 13 a plurality of wafer-like insulating chamber divider members 33, having a peripheral contour corresponding to a transverse section of the internal periphery of said tube, are inserted into said tube alternately with a plurality of tubular spacer members 34. In the present instance four of the wafer-like divider members 33 are employed, whereas three of the spacer elements 34 are disposed in association with them for holding the same in selected spaced relation to form fuse chamber compartments 35, 36 and 37. Said divider members 33 may be perforated as at 38 to provide for pressure equalization in the chambers 35, 36 and 37, but the said perforations are of limited air carrying capacity so as to minimize the circulation of convection air currents between these compartments.

The left end of the terminal member 24 has a recess 39 for receiving the bared conductor end section 40 of the cable 10. An axially extending notch 41 is provided in a side wall of this recess, as may be seen in Fig. 3, for receiving an axially projecting leg 42 of a wedge member 43; see Fig. 4. The exterior of the left end of the terminal member 24 is threaded as indicated at 44 for meshing with the internal threads 45 of a compression nut 46. A ring R of the wedge member 43 is adapted to slide over the bared end section of the cable, and the nut 46 has a frustro-conical internal face 61 for sliding against an inclined face 62 on the wedge member for forcing the wedge leg 42 radially inwardly of the notch 41 against said bared cable section when the nut 46 is advanced to the right by being turned upon the threads 44.

In connecting a cable 10 with the bus bar 11, the device thus far described will first be attached to the bus bar 11 by screwing the threaded sections 16 and 19 of the terminal member 14 and of the tube 13 into mesh with the threads 17 in the bus bar recess 18. An adjustable stop member 47 within the recess (or hole) 18 in the bus bar may be provided for limiting the distance to which the parts connected with the tubular member 13 are advanced into said recess and for causing the threads of the sections 16 and 19 to wedge tightly against the threads 17 meshed therewith. The insulation 48 and the sheath 49 of the cable 10 will be removed to bare the section 40 of the conductor portion of the cable, and an additional section of the sheath 49 will be removed to bare a section 50 of the insulation 48. This having been done, an internally threaded compression cap 51, a sealing bushing 52, an insulator sleeve 53 of Bakelite or the like having a threaded end section 54 of reduced diameter, a gasket 55, and an insulator sleeve 56 of Bakelite or the like are telescoped over the end of and onto the cable 10 in the order named. The bared conductor section 40 of the cable will then be inserted through the ring R and into the recess 39 of the terminal 24, the compressing nut 46 then being retracted to the left to permit displacement of the wedge member leg 42 radially outwardly within the notch 41. Thereupon the compression nut 46 will be screwed upon the thread section 44 by means of a wrench for engaging a polygonal section 60 of said nut. The internal frusto-conical surface 61 of the nut 46 is thus caused to advance against the inclined cam face 62 of the wedge member 43 to force the leg 42 thereof radially toward and against the bared conductor section 40 of the cable to clamp it firmly into mechanical and electrical connection with the terminal member 24. This having been done, the casing sleeve 56 is slid from the cable 10 and telescoped over the device into the position shown with its right end in abutting relation with the insulation 12 upon the bus bar 11. Next the gasket 55 will be carried against the left end of the sleeve 56 and seated within a shallow annular seat 64 within this end of said sleeve member. The casing sleeve 53 will then be slid to the right from the cable 10 and rotated for advancing its internally threaded section 65 onto an exteriorly threaded section 66 of the nut 46 incident to compressing the gasket between the sleeves 53 and 56 and pressing the right end of the sleeve 56 firmly against the insulation covering upon the bus bar. A polygonal section 67 upon the sleeve 53 may be engaged with a wrench for rotating said sleeve.

It will be noted in Fig. 2 that the inner periphery of the sleeve 53 adjacently to its left end has an annular flared face 68 so that when the sealing bushing 52 is next slid axially to the right upon the cable 10 the inclined annular face 69 thereof will fit flatly against said face 68. Finally, the internally threaded cap 51 is slid axially along the cable 10 to carry an inclined annular face 70 upon an end flange 71 thereof against an inclined annular end face 72 of the bushing 52 for compressing this sealing bushing firmly against the sheath 49 while the cap is screwed onto the threaded section 54 of the casing sleeve 53.

At this time the connector device will be completely installed, the mechanical connection for the cable 10 being successively through the terminal member 24, to which it is clamped by the wedge member 43 and the compression nut 46, and the insulator tube 13 which is in threaded relation with the right end of the terminal member 24 and of which the right end is in threaded relation with the tapped recess 18 in the bus bar. As explained above, the threaded connection of the insulator tube 13 with the bus bar may be augmented by the threaded section of the terminal member 16 when the set screw 27 is sufficiently long to mutually occupy the threaded hole 26 in the tube 13 and the tapped lateral bore 25 in the terminal member 14.

The current path through this connector device is from the conductor part of the cable end 40 through the terminal member 24, the fuse link 21, which may be an ordinary copper wire or rod of selected diameter, the terminal member 14, the threaded portion 16 of this member 14 and to the bus bar 11.

Since the right end of the casing sleeve 56 is pressed firmly against the insulator covering 12 upon the bus bar 11 when the casing sleeve 53 is screwed upon and thus advanced to the right upon the threaded section 66 of the nut 46, while the gasket member 55 is compressed firmly between the adjacent ends of the sleeves 53 and 56, and while the sealing bushing 52 is firmly compressed against the sheath portion 49 of the cable 10, the current carrying parts within the device are completely protected against the entrance of air or moisture. Corrosion of these parts is accordingly minimized.

When the bus bar 11 is to have cables connected with opposite of its sides, as illustrated in Fig. 1, the threaded recesses at opposite sides of a common stop member 47 will be provided in opposite ends of a hole through the bar as illustrated in Fig. 2. Any unused end of such a hole may be closed with a plug C until needed.

In the operation of this device, when the current carried by the cable reaches an amount that would cause undue heating thereof, the fuse link 21 melts at its central section within the compartment 36 to break the circuit and relieve the cable of load. It has been found in practice that the fuse link 21 always melts in the chamber 36. This is explained upon the theory that the heat near the ends of the link is dissipated into the electrodes 14 and 24, thus resulting in a temperature gradient which is highest at the link's mid-section and decreases as its ends are approached. Preservation of this temperature gradient is aided by the wafer-like divider members 33 for they virtually prevent circulation of air by convection between the compartments 35, 36 and 37. Small openings or perforations 38 in the divider members 33, however, permit the expulsion of expanded hot gases from the chamber 36 pursuant to the "blowing" of the fuse link.

Another function of the divider members 33 is to support the fuse link 21 at sections closely enough spaced that said link will have no tendency to sag when it becomes hot with a current load heating it near the melting point. It has been found that when the divider members are omitted, the link 21 will sometimes sag enough to reach the inner side of the tube 13 when the device is used in the horizontal position as shown. Such a sagging fuse link, upon further heating to the melting point, will form a miniature pool of fluid metal connected by drooping end sections of said element, and thus fail to interrupt the circuit. This problem is completely eliminated when the divider members 33 are used.

The second form of the invention, shown in Fig. 5, is for the most part identical with the first form, there being added to the device a connector lug 80. Those parts of this second form of the device corresponding to those in the first form are designated by the same respective reference characters with the letter *a* added. Said lug 80 comprises a substantially cylindrical shank 81 having an internally threaded recess 82 and an end flange 83 provided with a seat 84. This threaded recess 82 receives the threaded section 16a of a terminal member 14a as well as the threaded end section 19a of an insulator tube 13a. A gasket 85 within the seat 84 is adapted to be compressingly abutted by a casing sleeve 56a. A substantially flat end section 86 of the lug 80 is provided with a plurality of holes 87 for receiving bolts or the like (not shown) for connecting the same with a bus bar or similar electrical conductor.

That form of the invention shown in Fig. 6 is for interconnecting a pair of cables 10b which are like the cable 10 hereinabove described with respect to Fig. 2. Each end of the cable connector device shown in Fig. 6 is identical with the left end of the device shown and described with respect to Fig. 2. Those parts of said device corresponding to the device in Fig. 2 are designated by the same respective reference characters with the letter *b* added. Further detailed description of this third form of the invention is believed unnecessary.

While but three embodiments of the invention are herein disclosed, obviously other forms may be constructed without departing from the spirit of the invention, wherefore the scope of the invention is intended to be nowise restricted excepting as defined in the appended claims.

I claim:

1. A current limiting cable connector device comprising a tubular chamber having end sections insulated from one another, a fuse member within and extending axially of said chamber, terminal caps respectively secured to said chamber end sections and electrically connected with opposite ends of said fuse member, one of said caps having a plug portion within the chamber end section with which said cap is associated and an axial bore in said plug section for receiving the fuse end with which said cap is connected, there being a threaded lateral bore intersecting the axial bore in said plug portion, a set screw in said lateral bore and turned in the threads therein to bear firmly against the fuse end within said axial bore, and said cap also having a threaded section thereon exteriorly of said chamber to facilitate the mechanical and electrical connection of said device with an electrically conductive part.

2. The combination as set forth in claim 1, and wherein the exterior of the tubular member end section with which said one cap is associated has thereon a run of screw threads, and wherein the threaded section upon said cap is disposed coaxially with said run of threads and forms a continuation thereof.

3. A current limiting cable connector device comprising a tubular chamber having end sections insulated from one another, a fuse member within and extending axially of said chamber, terminal caps respectively secured to said chamber end sections and electrically connected with opposite ends of said fuse member, a run of screw-threads upon the exterior of one end portion of said tubular member, and the terminal cap secured to said tubular member end portion having a cylindrical exterior peripheral section disposed coaxially with and contiguously to said end portion, and a run of screw-threads on said cylindrical section forming a continuation of said screw-threads on the tubular member end portion.

4. In a current limiting cable connector device, a tubular fuse chamber, a fuse terminal upon an end of said chamber and having an exteriorly threaded end portion projecting axially from said chamber, a cable-end receiving recess within and coaxial with said projecting portion, the body of said projecting portion about said recess having a notch therein, a wedge member in said notch, said wedge member having a cam section projecting radially outwardly from said projecting portion of the terminal, and a nut having threads meshed with said threaded portion of the terminal and advanceable thereon against the cam section of said wedge member to force the latter radially inwardly of said recess.

5. In a current limiting connector device for connecting a cable with a current carrying member, the combination of a tubular fuse chamber, terminal members at opposite ends of said chamber for respective connection with said cable and with said current carrying member, thread carrying means upon the terminal member for connection with the cable, a casing sleeve disposed about said fuse chamber, a complemental casing sleeve having a threaded portion of which the threads are meshed with those upon said thread carrying means, an end of said complemental sleeve being in abutting relation with an end of the first sleeve, and the complemental sleeve being rotatable to cause axial advancement thereof, by said meshed threads, against the abutted end of the first sleeve and to thus axially advance the first sleeve to press its opposite end into abutting relation with said current carrying member.

6. In a current limiting connector device for connecting a cable with a bus bar or the like, the combination of a tubular fuse chamber, fuse terminal members at opposite ends of said chamber, cable attaching means upon one of said terminal members, a chamber threaded section at the end of said chamber at which the other terminal member is disposed, a threaded section on said other terminal member arranged coaxially with said chamber threaded section, and a connector lug for mechanically connecting said chamber with said bus bar and electrically connecting said other terminal member with said bar, said lug comprising bus bar connecting means at one end and internal thread means within its opposite end, and said thread means being meshed with the threaded sections on said chamber and on said other terminal member.

7. In a current limiting device for interconnecting a pair of axially aligned cable end sections, the combination of a tubular fuse chamber, fuse terminal members at and connected with opposite ends of said chamber, cable clamping means upon each of said terminal members for respective connection with said cable end sections and axially aligned with said chamber, thread carrying members respectively on said terminal members, a central casing sleeve disposed about said fuse chamber, complemental casing sleeves at opposite ends of the central sleeve and each having a threaded section of which the threads are meshed with those upon one of said thread carrying members, and the complemental sleeves being rotatable to cause axial advancement thereof by said meshed threads to abut against the ends of said central sleeve.

8. A current limiting cable connector device comprising a fuse chamber including a tubular wall of which at least a transverse section is formed of insulating material to prevent the existence therein of an electrically conductive path between opposite ends thereof, said wall being adapted to contain a longitudinal fuse member extending axially therein, electrically conductive terminal members respectively upon the ends of said chamber and adapted to electrically connect with opposite ends of said fuse member, one of said terminal members including a section projecting endwise from said wall and of substantially the same diameter as such wall, electrically conductive attaching means comprising screw-threads directed circumferentially about said projecting section of said terminal member, and cable connecting means upon the other terminal member and constructed and arranged for receiving a cable end disposed substantially coaxially of said tubular wall.

9. A current limiting cable connector device comprising a fuse chamber including a tubular wall of which the end sections are insulated from one another and adapted to contain a longitudinal fuse member disposed axially therein, electrically conductive terminal members respectively upon the ends of said tubular wall and adapted to electrically connect with opposite ends of such a fuse member, one of said terminal members including a section projecting endwise from an end of said wall and of substantially the same diameter thereof, electrically conductive attaching means comprising screw-threads directed circumferentially about said projecting terminal section, additional connecting means comprising screw-threads directed circumferentially about a peripheral section of said tubular wall adjacently to said end thereof, means for holding the other of said terminal members and said wall against relative axial movement, and cable connecting means upon such other terminal member and constructed and arranged for receiving a cable end disposed substantially coaxially of said tubular wall.

10. For use in combination with a fuse chamber provided with a tubular wall having an end opening and attachment means adjacently to such opening; a terminal member disposable in telescopic relation with said chamber and comprising means cooperable with said attachment means to prevent relative axial movement between said member and said tubular wall, said terminal member also comprising fuse connecting means including an axial bore for receiving a section of a fuse element and communicative with an end of said member, said member including a threaded bore intersecting such axial bore, a set screw in said threaded bore and advanceable by rotation therein, and cable connecting means including a cable-end receiving recess at the opposite end of said member and substantially coaxially therewith.

11. A current limiting cable connector device comprising a fuse chamber including a tubular wall of which the end sections are insulated from one another and adapted to contain a longitudinal fuse member arranged axially therein, sets of internal screw-threads directed circumferentially about opposite end sections of said wall, electrically conductive terminal members at opposite ends of said tubular wall and for electrically connecting with opposite ends of such a fuse member, said terminal members each including threaded plug section respectively meshed with said sets of internal screw-threads whereby said terminal members are rigidly connected through said wall and each plug section having an axial bore for receiving an end of said fuse member, and cable connecting means upon each of said terminal members and constructed and arranged for receiving respective cable end sections disposed coaxially with said tubular wall.

12. A current limiting cable connector device comprising a fuse chamber including a tubular wall of which the end sections are insulated from one another and adapted to contain a longitudinal fuse member arranged axially therein, sets of internal screw-threads directed circumferentially about opposite end sections of said wall, electrically conductive terminal members at opposite ends of said tubular wall and for electrically connecting with opposite ends of such fuse member, said terminal members each having a threaded plug section respectively meshed with said sets of internal screw-threads whereby said terminal members are rigidly connected through said wall, cable connecting means upon each of said terminal members and constructed and arranged for receiving respective cable end sections disposed coaxially with said tubular wall, a casing sleeve disposed about said tubular wall, complemental casing sleeves at opposite ends of said casing sleeve, and connecting means between each of said complemental sleeves and the terminal member at the corresponding end of said tubular wall, and at least one of said connecting means including screw-threads manipulative for pressing all of said sleeves axially against the other of said connecting means.

ANDREW E. PAPP.